(12) United States Patent
Ueda et al.

(10) Patent No.: US 7,320,199 B2
(45) Date of Patent: Jan. 22, 2008

(54) SEAL STRUCTURE FOR A VEHICLE

(75) Inventors: Toshiyuki Ueda, Atsugi (JP); Koso Deguchi, Hatsukaichi (JP)

(73) Assignees: Nissan Motor Co., Ltd., Kanagawa-Ken (JP); Nishikawa Rubber Co., Ltd., Hiroshima-Ken (JP)

( * ) Notice: Subject to any disclaimer, the term of this patent is extended or adjusted under 35 U.S.C. 154(b) by 389 days.

(21) Appl. No.: 10/919,433

(22) Filed: Aug. 17, 2004

(65) Prior Publication Data

US 2005/0050800 A1    Mar. 10, 2005

(30) Foreign Application Priority Data

Sep. 8, 2003    (JP) ............................ P 2003-315811

(51) Int. Cl.
*E06B 7/16*    (2006.01)

(52) U.S. Cl. ..................................... 49/479.1

(58) Field of Classification Search ............... 49/475.1, 49/479.1
See application file for complete search history.

(56) References Cited

U.S. PATENT DOCUMENTS

| | | | | |
|---|---|---|---|---|
| 4,884,370 A | * | 12/1989 | Nozaki et al. | 49/479.1 |
| 4,977,706 A | * | 12/1990 | Kisanuki | 49/479.1 |
| 5,155,938 A | * | 10/1992 | Nozaki | 49/441 |
| 5,636,895 A | * | 6/1997 | Ito et al. | 296/146.9 |
| 6,158,172 A | | 12/2000 | Yamane et al. | |
| 6,237,287 B1 | * | 5/2001 | Nakagawa et al. | 49/479.1 |
| 6,641,205 B1 | * | 11/2003 | Russell et al. | 296/146.9 |
| 7,055,285 B2 | * | 6/2006 | Nozaki | 49/479.1 |

FOREIGN PATENT DOCUMENTS

| | | |
|---|---|---|
| GB | 2 377 246 A | 1/2003 |
| JP | 5-40019 | 5/1993 |
| JP | 7-125538 | 5/1995 |
| JP | 7-156653 | 6/1995 |
| JP | 2001-18659 | 1/2001 |
| JP | 2003-94950 | 4/2003 |

* cited by examiner

*Primary Examiner*—Jerry Redman
(74) *Attorney, Agent, or Firm*—McDermott Will & Emery LLP

(57) ABSTRACT

A seal structure for a vehicle, which includes a door member and a seal member attached thereto. The seal member includes a horizontally extending upper seal lip which comes into elastic contact with a peripheral part of an opening provided on a vehicle body, and a vertically extending side seal lip which comes into elastic contact with another peripheral part of the opening. The upper seal lip and side seal lip are connected to each other by die forming, thus forming a connected portion thereof. The upper seal lip and side seal lip have, on a side of the connected portion to be proximate to the vehicle body when the door member is closed, a seal sheet member covering the connected portion.

5 Claims, 4 Drawing Sheets

SEAL STRUCTURE FOR A VEHICLE

BACKGROUND OF THE INVENTION

1. Field of the Invention

The present invention relates to a seal structure for a vehicle, and particularly, to a structure of an upper corner of a door weatherstrip.

2. Description of Related Art

As shown in FIGS. 6 and 7, each of door frames 3 and 4 of vehicle doors 1 and 2 is provided along the periphery thereof with a door weatherstrip 5 attached thereto. The door weatherstrip 5 comes into elastic contact with a peripheral part of a door opening of a vehicle body 10, and seals a gap between the door frame 3 or 4 and the vehicle body 10, when the corresponding door 1 or 2 is closed.

Each door weatherstrip 5 includes an upper seal lip 7 extended substantially in a longitudinal direction of the vehicle, which has a tongue-shape in cross section, and comes into elastic contact with a roof panel 10a, and side seal lips 8 extended substantially in a vertical direction, which have tongue-shape in cross section, and come into elastic contact with pillars 10b and 10c.

The upper seal lip 7 and the side seal lip 8 are connected to each other by die forming on an upper corner of the corresponding door frame 3 or 4 on the center pillar 10b side, that is, on a rear upper corner 3a of the door frame 3 of the front door 1, or on a front upper corner 4a of the door frame 4 of the rear door 2.

Moreover, a vertically extending hollow parting seal portion 9 is formed integrally with the side seal lip 8.

SUMMARY OF THE INVENTION

In such a seal structure as described above, the corner denoted by a reference symbol P, where the upper seal lip 7 and the side seal lip 8 are connected to each other, forming a single flanged lip construction. Accordingly, as shown in FIG. 8, the corner P sometimes turns over toward an inside of the vehicle in a folded manner when the corresponding door 1 or 2 is closed. Particularly, at a corner on a hinged end of the rear door 2, that is, on the front upper corner 4a of the door frame 4, while the rear door 2 is being closed, the corner P moves forward relative to the vehicle body 10 and closer to the vehicle body 10 (in a direction indicated by an arrow shown in FIG. 8). A distal end Pc thereof then comes into elastic contact with the periphery of the door opening while receiving backward sliding resistance (in an opposite direction to a direction in which the corner P is extended). Accordingly, the corner P is prone to turn over.

Such a turning over of the corner P affects sealing performance of the weatherstrip 5, also affecting opening and closing of the doors.

One of conceivable measures against the above is to lower height of the distal end Pc of the corner P. However, this makes an apparent width of the upper seal lip 7 non-uniform, and accordingly, an appearance of the weatherstrip 5 becomes deteriorated.

Moreover, sealing performance of the portion concerned is lowered, and high pressure water for washing the vehicle may enter the inside of the vehicle.

The present invention was made in the light of these problems. An object of the present invention is to provide a good looking seal structure for a vehicle, which maintains high sealing performance.

An aspect of the present invention is a seal structure for a vehicle, comprising: a door member by which an opening provided on a vehicle body is closed; and a seal member attached to the door member, the seal member comprising a horizontally extending upper seal lip which comes into elastic contact with a peripheral part of the opening of the vehicle body, and a vertically extending side seal lip which comes into elastic contact with another peripheral part of the opening of the vehicle body, the upper seal lip and side seal lip being connected to each other by die forming, thus forming a connected portion thereof, wherein the upper seal lip and side seal lip are provided at the connected portion thereof on a side of the connected portion to be proximate to the vehicle body as the door member is closed, with a sheet member covering the connected portion.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
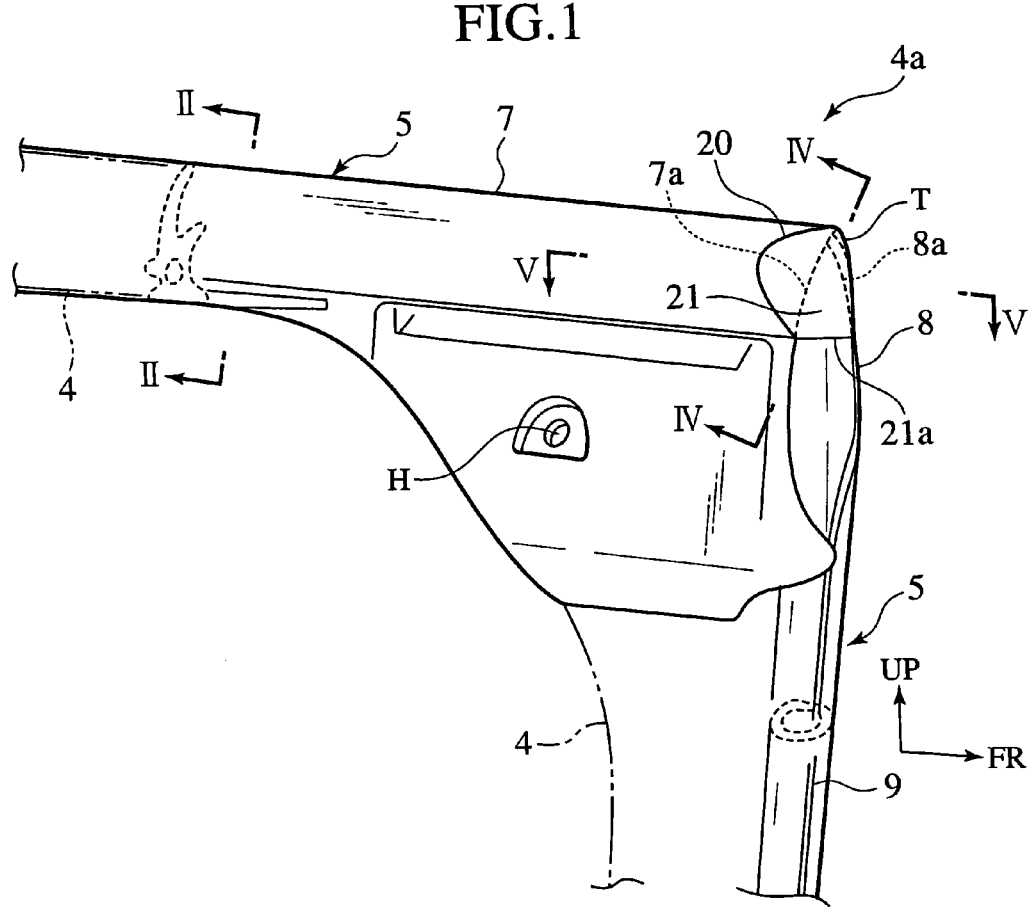
FIG. 1 is an enlarged perspective view showing a seal structure according to an embodiment of the present invention.

An embodiment of the present invention will be explained below with reference to the drawings, wherein like members are designated by like reference characters.

In a seal structure according to this embodiment, a door weatherstrip 5 is attached along the periphery of each of door frames 3 and 4 of doors 1 and 2 in a similar way to a comparative example. The door weatherstrip 5 includes an upper seal lip 7 extended substantially horizontally in a longitudinal direction of the vehicle, and side seal lips 8 extended substantially in a vertical direction. The upper seal lip 7 has an upwardly extending tongue-shape in cross section. The side seal lips 8 have a frontwardly or rearwardly extending tongue-shape in cross section.

As shown in FIG. 1, on a front upper corner 4a of the door frame 4, the upper seal lip 7 and one of the side seal lips 8 meet approximately at right angle, and are connected to each other by die forming to form a corner end T extended toward a front upper direction. Such a connected portion formed as described above is fixed to the door frame 4 by fitting an unillustrated clip and the like into a hole H.

Note that, though FIG. 1 shows the front upper corner 4a of the door frame 4 of the rear door 2, upper seal lips 7 and side seal lips 8 are connected to each other in a similar way by die forming also on a front upper corner and rear upper corner 3a of the door frame 3 of the front door 1 and a rear upper corner of the door frame 4 of the rear door 2.

When the door 2 is closed, the upper seal lip 7 and the side seal lip 8 come into elastic contact with a roof panel 10a and a pillar 10b, respectively, and seal gaps between the door 2 and the roof panel 10a and between the door 2 and the pillar 10b, respectively. Moreover, a vertically extending hollow parting seal portion 9 is formed integrally with the side seal lip 8. Note that, instead of the parting seal portion 9, a vertically extending side seal lip 8 having a tongue-shape in cross section may be provided.

Figure 2:
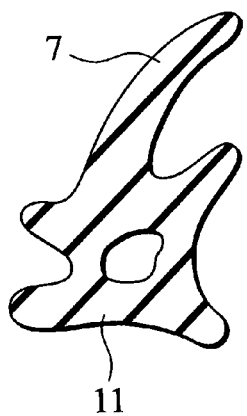
FIG. 2 is an enlarged cross-sectional view of an upper seal lip along a line II-II of FIG. 1.
Figure 3:
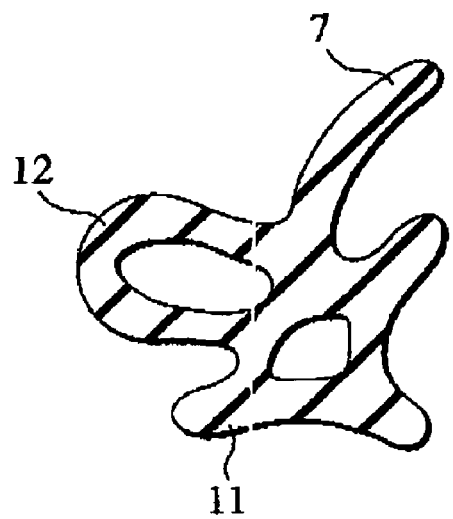
FIG. 3 is an enlarged cross-sectional view of another example of the upper seal lip, corresponding to FIG. 2.

Moreover, though the upper seal lip 7 is extended in cross section substantially in a vertical direction from an attachment base 11 located on a lower side thereof as shown in FIG. 2, a hollow seal lip 12 protruding toward the vehicle inside may be provided on a portion between the upper seal lip 7 and the attachment base 11 as shown in FIG. 3. According to this structure, when the door is closed, both of the upper seal lip 7 and the hollow seal lip 12 come into contact with the roof panel 10a, and accordingly, double sealing is established.

On the front upper corner 4a of the door frame 4, a vehicle-inside side surface (or a surface on a side of a seal lip to be proximate to the vehicle body 10 when the door 2 is closed) of a front end 7a of the upper seal lip 7 and a vehicle-inside side surface of a front upper end 8a of the side seal lip 8 are covered with a seal sheet member 20 made of a material formed by die forming. The seal sheet member 20 is formed into a curved shape so as to bulge toward the vehicle inside, and is joined to the upper seal lip 7 and the side seal lip 8 continuously at a peripheral portion thereof except a lower end edge thereof. Specifically, as shown in FIG. 4, on the front upper corner 4a of the door frame 4, a pocket hollow portion 21 having an opening 21a on a lower end thereof is formed of the upper seal lip 7, the side seal lip 8 and the seal sheet member 20.

An outer side surface of the end 7a of the upper seal lip 7 and an outer side surface of the end 8a of the side seal lip 8 are continuous with each other. Hence, the vehicle-inside side surfaces of the ends 7a and 8a of these seal lips 7 and 8 are covered with the seal sheet member 20, and thus double seal walls are formed on the seal lips 7 and 8 on the front upper corner 4a.

Figure 5:
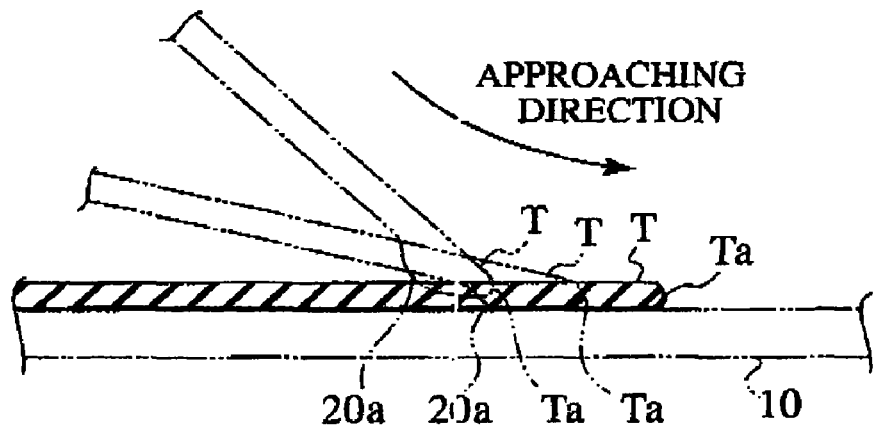
FIG. 5 is a cross-sectional view along a line V-V of FIG. 1, showing a state where a corner of a seal lip of FIG. 1 comes into elastic contact with a vehicle body.
Figure 6:
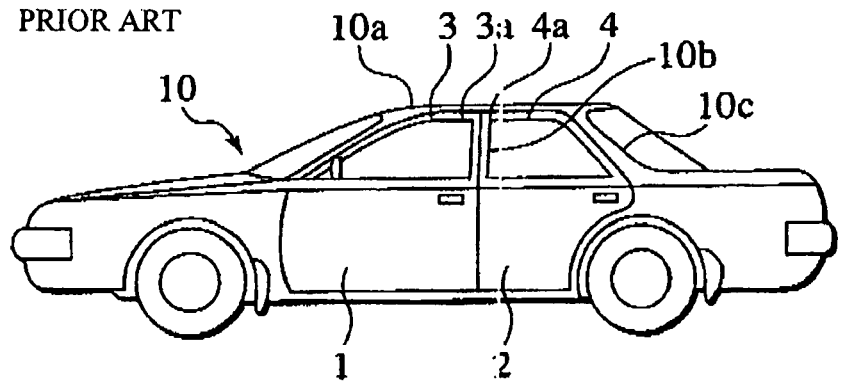
FIG. 6 is a side view of an exterior appearance of a vehicle.
Figure 7:
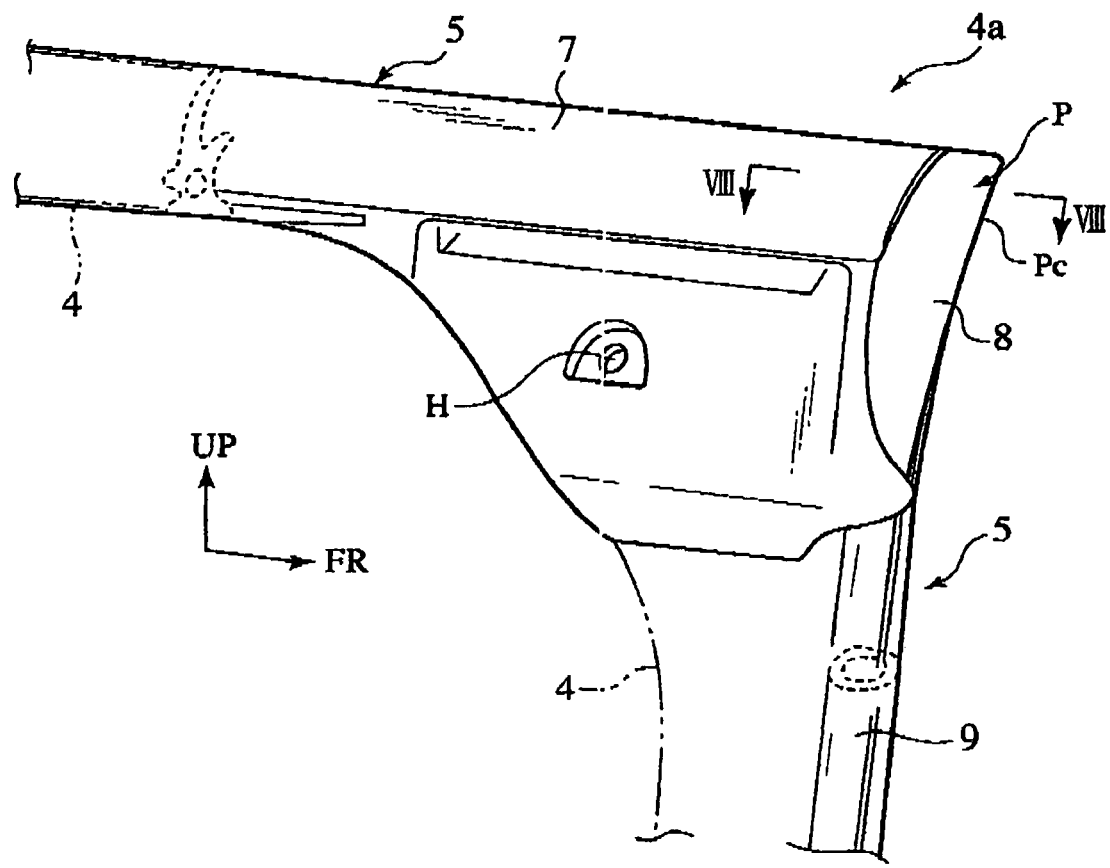
FIG. 7 is an enlarged perspective view showing a seal structure for the vehicle according to a comparative example.
Figure 8:
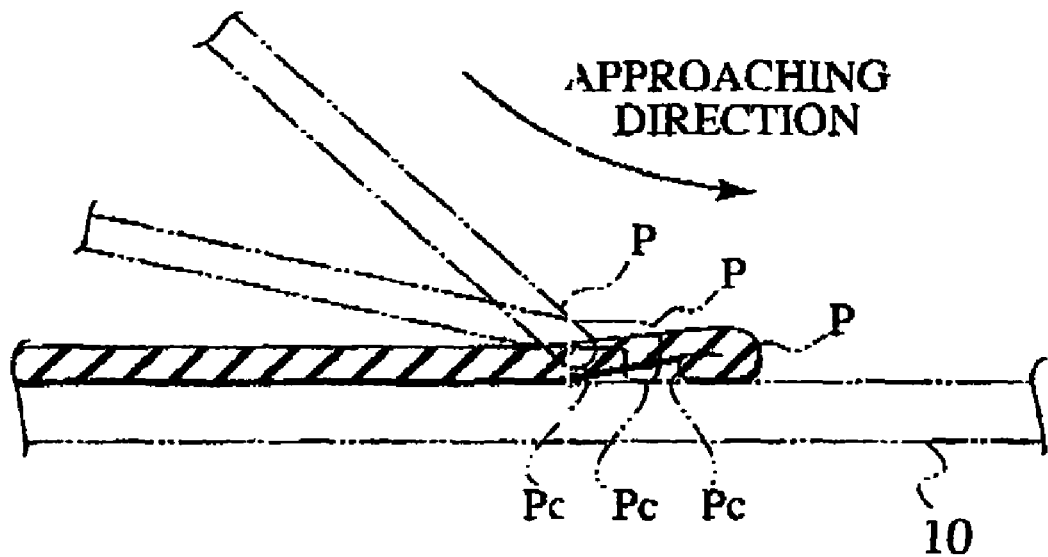
FIG. 8 is a cross-sectional view along a line VIII-VIII of FIG. 7 showing a sate where a corner of a seal lip of FIG. 7 comes into elastic contact with the body, in which a solid arrow indicates an approaching direction of a weatherstrip when a door is closed.

Rigidity and resilience of the corner end T of the seal lips 7 and 8 are thus enhanced in comparison with the case of a single seal wall, and accordingly, as shown in FIG. 5, the corner end T is prevented from turning over when coming into elastic contact with a vehicle body 10.

Figure 4:
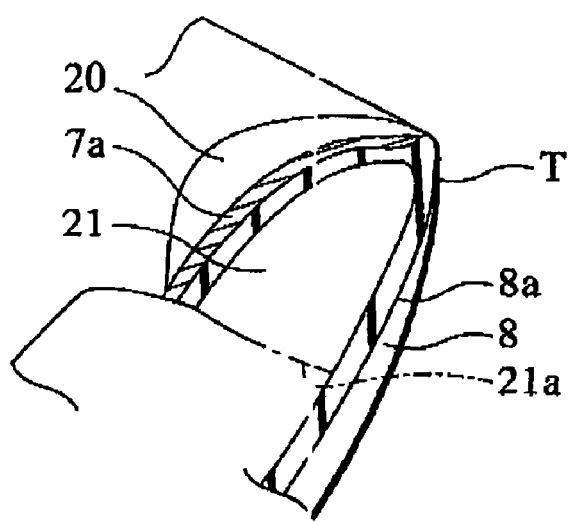
FIG. 4 is an enlarged cross-sectional view along a line IV-IV of FIG. 1.

Moreover, as shown in FIG. 4, the seal sheet member 20 bulges toward the vehicle inside. For this reason, when the door is closed, as shown in FIG. 5, a region 20a of the corner end T, which bulges toward the corner end T, comes into elastic contact with the vehicle body 10 first. Therefore, a backward sliding resistance load (in an opposite direction to a direction in which the corner end T is extended) is not applied to a tip Ta of the corner end T, and the corner end T is prevented from turning over.

This configuration exerts an effective turning-over prevention effect when being applied to such a region where the corner end T of the seal lip slides on the vehicle body 10 while moving forward in the extended direction of the corner end T, the region being the corner on the hinged end of the door, that is, the front upper corner 4a of the door frame 4 of the rear door 2 and the rear upper corner of the door frame 3 of the front door 1.

Note that the hollow portion 21 can be made as a solid portion in a manner that all or a part thereof is filled with a die forming material. Consideration must be given in determining ratio of solidity or filling rate thereof for maintaining smooth closing of the door.

Moreover, though the seal sheet member 20 is continuously joined, excepting the lower end opening 21a thereof, to the vehicle-inside side surfaces of the ends 7a and 8a of the seal lips 7 and 8 without any gap left therebetween in this embodiment, the seal sheet member 21 may be partially joined to the vehicle-inside side surfaces by means of beads.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2003-315811, filed on Sep. 8, 2003, the disclosure of which is expressly incorporated herein by reference in its entirety.

What is claimed is:

1. A seal structure for a vehicle, comprising:
   a door member by which an opening provided on a vehicle body is closed; and
   a seal member attached to the door member, the seal member comprising
   a horizontally extending upper seal lip having a tongue-shaped cross section, which comes into elastic contact at one side thereof with a peripheral part of the opening of the vehicle body,
   a vertically extending side seal lip having a tongue-shaped cross section, which comes into elastic contact at one side thereof with another peripheral part of the opening of the vehicle body, wherein the upper seal lip and side seal lip meet to form a joint therebetween, and
   a sealing sheet member joined at a periphery thereof to the one side of the upper seal lip and to the one side of the side seal lip, so as to cover the joint.

2. The seal structure for a vehicle according to claim 1, wherein the sealing sheet member is formed to provide a pocket hollow portion at the joint between the upper seal lip and the side seal lip.

3. The seal structure for a vehicle according to claim 2, wherein the pocket hollow portion is filled with a die forming material.

4. The seal structure for a vehicle according to claim 1, wherein the sealing sheet member has a curved shape to form a bulge on the one side of the upper seal lip.

5. A seal structure for a vehicle, comprising:
   a door member by which an opening provided on a vehicle body is closed; and
   a seal member attached to the door member, the seal member comprising
   a horizontally extending upper seal lip having a tongue-shaped cross section, which comes into elastic contact at one side thereof with a peripheral part of the opening of the vehicle body,
   a vertically extending side seal lip having a tongue-shaped cross section, which comes into elastic contact at one side thereof with another peripheral part of the opening of the vehicle body, wherein the upper seal lip and side seal lip meet to form a joint therebetween, and
   a sealing sheet member joined at a periphery thereof to the one side of the upper seal lip and to the one side of the side seal lip, so as to cover the joint,
   wherein the sealing sheet member has a curved shape to form a bulge on the one side of the upper seal lip and the bulge is provided at a corner on a hinged end of the door member, so that the bulge comes into contact with the vehicle body before the other part of the upper seal lip and side seal lip come into contact with the vehicle body, as the door member is closed.

* * * * *